UNITED STATES PATENT OFFICE

EMIL GUSTAF TORVALD GUSTAFSSON, OF STOCKHOLM, SWEDEN

PROCESS FOR PRODUCING METALS IN ELECTRIC FURNACES

No Drawing. Application filed May 11, 1927, Serial No. 190,652, and in Sweden September 27, 1926.

My present invention relates to processes for producing metals, for instance iron, steel and iron alloys, wherein a metalliferous charge which may have been previously reduced or may be simultaneously reduced is melted in an electric furnace, while forming metal and slag, said furnace having one or more electrodes, capable of being raised and lowered, applied over the bath in the furnace and directed downwardly. My invention relates especially to processes of this kind in which the charge is reduced and/or melted on top of a slag bath in the furnace, i. e. whilst floating or lying as a relatively thin layer on or in said slag bath. At the beginning of a heat such a slag bath may be formed in the furnace before introducing the charge, said slag bath then increasing in depth during the course of the heat on account of the slag formed in the reduction and/or melting of the charge.

My invention may be applied to processes of the kind referred to carried out in large scale electric furnaces, for instance of 250 kilowatts per electrode or still more, small scale experimental furnaces being not included.

In heats carried out with charges, containing, for instance, iron ore and charcoal or pit-coal in a quantity proportioned to the desired carbon content in the steel as well as lime in a quantity proportioned so as to obtain a suitable slag, said charges having the form either of briquettes of the finely divided raw materials or of a more or less intimate mixture of such materials in a more or less fine-grained state, it has proved that the voltage used in the furnace between an electrode and the metal bath (or the furnace bottom at the beginning of the heat) should stand in a certain relation to the power supplied to the furnace, i. e. the furnace should be operated with the electrode in such a position that the resistance between the electrode and the metal bath amounts to a certain value in order to utilize in the best possible manner the electric power supplied as well as the furnace proper and to get a perfect working of the metal producing process as a whole and a smaller electrode consumption. In electric steel furnaces, e. g. of the Heroult-type, and electric pig-iron furnaces, e. g. of the Elektrometall-type, this resistance has always been held at a value that is not sufficient for a successful accomplishment of reduction processes now in question or, in other words, the voltage has been held too low in relation to the power used. The voltage between two electrodes in steel furnaces is usually held at 110-120 volts, when using 3-phase alternating current and three electrodes. The power necessary for a furnace of a given capacity is regulated through the current strength supplied, for instance, when using delta-connected electrodes, according to the common formula $$N = \sqrt{3} \cdot e \cdot i \cos\varphi$$

Where $N=$ the power in watts,
$\quad e=$ the voltage in volts,
$\quad i=$ the strength of current in amperes, and
$\quad \varphi=$ the power factor.

For instance, in a furnace of 3000 kw., the current strength $i$ is about 17500 amperes, if $\cos \varphi$ is assumed to be 0.90 and $e = 110$ volts.

For a Heroult-furnace of the size mentioned above the voltage between an electrode and the metal bath is $\frac{110}{\sqrt{3}} = 63.5$ volts. Consequently, the ohmic resistance between an electrode and the metal bath is $$\frac{63.5}{17500} = 0.0036 \text{ ohm}$$

which, consequently, is sufficient in a common steel furnace. An ohmic resistance of the same low value or still lower resistances are usually used also in electric pig-iron furnaces of the Elektrometall-type, in which voltages between an electrode and the iron bath of 30 to 40 volts are normally used, while using current strengths of 12000 to 16000 amps., corresponding to an ohmic resistance per electrode of about 0.0025 ohm.

The object of the present invention is to provide a novel and useful method for running large scale electric furnaces of the kind referred to, when carrying out processes of the kind set forth, permitting a more effective utilization of the electric power supplied as well as of the furnace proper, a more perfect working of the metal production process as a whole and a smaller electrode consumption.

In order to attain this object, the electric power is, according to the present invention during the main part of a heat or smelting supplied to the furnace with such voltage between the electrodes or each of the electrodes and the metal bath as corresponds to a combined arc and slag resistance, i. e. ohmic resistance, of minimum 0.020 ohm per electrode. In this connection the expression "ohmic resistance" is understood to design the ratio between the voltage and the amperage, and the expressions "heat" and "smelting" are understood to design the interval between two tappings.

When running the furnace with an ohmic resistance lower than 0.02 ohm per electrode, it has proved that the process may be carried out, although with some difficulty, but that as compared with running with higher resistances the current consumption and the electrode consumption will be considerably higher, the reduction will proceed more slowly and the temperature at the bottom of the furnace will have a tendency to become too high which latter circumstance has a detrimental influence upon the life of the furnace. The higher the resistance is held, the better the reduction and melting of the charge on or in the slag bath will take place. Thus, smeltings have been carried out with very good results with ohmic resistances up to 0.06 ohm per electrode and at all intervening stages, for instance, 0.035, 0.030, 0.035, 0.040, 0.045, 0.050 ohm etc. per electrode. In reducing and melting in an electric furnace of say 3000 kw. briquettes or other bodies containing a mixture of finely divided oxide ore and finely divided reducing agent it has been provided that the best results were obtained when running with an ohmic resistance of between 0.035 and 0.045 ohm between each of the three electrodes and the metal bath. In furnaces of a larger scale, for instance of 5000 kw. or more, it is, however, difficult, from practical reasons, to hold the resistance at the highest values, for instance over 0.040 ohm, as the voltages between the electrodes, i. e. the resultant voltages, then amounting to such high values as to cause difficulties as regards the insulation of the electrodes and danger for the workers, provided the current supplied is not divided on a great number of small electrodes, this being, however, not suitable from several points of view, for instance on account of the weakening of the furnace roof and by reason of a corresponding greater number of cooling places and current supplying devices being required. Consequently, in such large scale furnaces it may be necessary to be satisfied with a lower ohmic resistance per electrode, for instance 0.025 to 0.030 ohm, though higher resistances are, however, more desirable. Particularly on reducing and/or melting charges which do not consist of briquettes or other bodies of a fine-grained mixture of the raw materials but of a more or less loose mixture of said materials in a more or less fine-grained state, it has proved necessary to run the furnace with high resistance. For such charges a resistance not below 0.025 ohm per electrode should be used, resistances of higher value being, however, more suitable.

It has also proved that the ohmic resistance between the electrodes or each of the electrodes and the metal bath may be varied dependent on the nature of the metal to be produced. So for instance, when producing iron alloys from an iron ore charge and a charge containing oxide ore of the alloying metal, which different charges are reduced and melted the one after the other, the resistance used when reducing and melting the iron ore charge may be different to that used when reducing the charge containing the alloying metal, and as a common rule it may be said that the resistance should be held lower, the more difficult the metal or metal alloy to be produced is to reduce and/or melt.

The reason why in the processes referred to the ohmic resistance must be held so much higher than in common electric steel or pig-iron furnaces resides in the special manner of performing the reduction and/or melting of the charge floating or lying on and in the slag bath in the furnace, the heat being divided as well as possible over the surface of the slag bath where the greatest heat consumption takes place, which is effected by forming sufficiently long arcs between the electrodes and the slag bath. As in the slag bath a relatively high resistance always exists increasing with the thickness of said bath, a rather high resistance must be put in between the electrode and the metal bath, i. e. the voltage must be held high in relation to the power supplied, as otherwise, when automatically maintaining the strength of current, i. e. the amperage, at a constant value by means of an automatically operating regulator controlling the position of the electrode in relation to the metal bath, the electrode will dip into the slag so that no arc will be formed. The curve of temperature distribution of an arc shows clearly that the arc must have a rather considerable length for obtaining a good distribution of the heat over the bath. Thus, the length of the arc and the relatively thick slag layer are the causes of the necessary high resistance, or more explicitly spoken, the relation between voltage and amperage. Running with an arc during the reduction and/or melting involves also the additional advantage of the electrode not coming into contact with the charge, which is of great importance especially when carbon binding metals or alloys thereof low in carbon are to be produced.

In a process of the kind referred to, the resistance in the slag has the important object to develop the heat required for maintaining the slag and the underlying metal at the necessary high temperature. Processes in which the charge is reduced and/or melted lying on or in the surface of the slag, which surface may form a somewhat tenacious skin where the charge is lying, cannot be carried out by supplying the electric current without such a resistance in the slag, for instance by solely running an arc between two electrodes above the bath, the heat consumption at the surface of the slag bath making it impossible to obtain a sufficiently high temperature at the bottom of the furnace, provided the temperature above the bath is to be held below the temperature critical to the duration of the lining. When the electric current passes through the slag, a considerable amount of heat is developed in same on account of the resistance therein, so that the slag will be sufficiently warm to heat the metal to the necessary degree and also to give off heat to the charge floating or lying on the surface of the slag. The more difficult the metal to be produced is to melt, the warmer the metal at the bottom of the furnace must, of course, be held in order not to congeal. When producing alloys having a high percentage of the alloying metal, for instance low-carbon ferrochrome or so-called rustless iron with 13 to 15% of chromium, a rather great part of the resistance per electrode must, consequently, be laid in the slag. The total resistance in the slag and in the arc should, however, during the main part of the heat amount to at least 0.02 ohm per electrode or preferably be still higher.

If during the smelting the temperature of the metal shows a tendency of becoming too low so that risk arises of the metal congealing or of the conversion between the metal and the slag not becoming so good as required, for instance for desulphurizing the metal, the electrode or electrodes may preferably be immersed into the slag for shorter or longer periods, i. e. the resistance per electrode may be decreased and thereby a large amount of heat supplied to the lower portion of the slag bath. The heat may be supplied to different layers of the slag bath and the temperatures in different parts of the furnace may be regulated by varying the positions of the electrodes in relation to the slag and thus varying the combined arc and slag resistance per electrode. Commonly, the furnace is operated so as to hold the electric power supplied constant, i. e. for a given amount of voltage the amperage is held at a corresponding constant value, this being effected by automatically operating regulators which can be set for different values of the amperage thereby controlling the positions of the electrodes in relation to the metal bath. At high combined resistance, i. e. at relatively long arc, the supply of heat mainly takes place to the surface of the slag bath, at medium resistance, i.e. at short arc or beginning contact between the electrode and the slag bath, the greatest supply of heat still takes place to the upper portion of the slag bath, and at low resistance, i.e. with the electrode dipping into the slag, the greatest supply of heat occurs to the lower portion of the slag bath.

As in processes of the kind here in the first place referred to in which a metalliferous charge is fed onto a slag bath in the furnace, either continuously or at rather short intervals, the slag bath during the heat or smelting successively increases in thickness, so that the path of current will be lengthened for that main part of the current which passes through both the slag and the metal, causing a corresponding increase of the over-all resistance of the circuit, it is suitable one or several times during the smelting to tap off or in any other way to remove a suitable portion of the slag from the furnace. From that point of view a continuous tapping of the slag is most suitable, so that the slag is permanently maintained at a given thickness, this is, however, rather difficult to arrange. Particularly when using tiltable furnaces, it is, however, relatively easy to tap off slag at a suitable number of times during the smelting without any interruption of the process being necessary. In any case the thickness of the slag layer is preferably so regulated that the resistance in the slag only gives the heat necessary for maintaining the metal bath and the slag at the necessary high temperature, whereas the rest of the heat is developed at that place where the heat consumption is greatest, thus, at the surface of the slag bath.

The increase in resistance and, consequently, in drop of voltage in the slag bath during the course of the smelting can, however, instead of by tapping off slag, be compensated for by increasing the voltage between the electrode and the metal bath in one or more steps, so that the same drop in voltage or the same resistance in the arc, and, consequently the length of the arc can be maintained, the electric power supplied to the furnace thereby increasing, if the current strength is remained unaltered. Such control of the voltage may be effected, for instance, by changing the connections of the transformers or by changing the ratio of turns in the windings by using suitable taps on the transformers. If the electric power is to be held constant, which is commonly the case, the amperage supplied to the furnace should be decreased in a degree corresponding to the increase in voltage, this being effected by setting the electrode into such raised position in relation to the metal bath as corresponds to the increased voltage drop as well as the desired amperage, preferably by means of automatically operating regulators. Consequently, the supply of power is preferably regulated by changing the voltage and the position of the electrode in relation to the metal bath in such a way that the combined arc and slag resistance between each of the electrodes and the metal bath is increased to about the same degree as the resistance in the slag increases, i. e. the arc resistance is held constant during the course of the smelting.

The inconveniences of an increased resistance on account of the increase in thickness of the slag bath during the heat or smelting will, of course, be reduced, if the slag has a high specific electric conductivity. Consequently, it will be possible to eliminate in part said inconveniences by suitably adapting the composition of the slag, for instance by making the slag strongly basic or by giving it a relatively high percentage of metal oxides, said latter measure being suitable especially when metals of very low carbon content are to be produced, for instance iron and iron alloys of a carbon content of or below 0.05%.

On constructing furnaces in which the process of the present invention is to be carried out, the furnace as well as appurtenant transformers and conductors may be calculated either for high working voltages, for instance 110–220 volts between an electrode or each of the electrodes and the metal bath, or for voltages below 110 volts. Higher voltages may, however, be used without the invention being dependent thereupon. In the former case when using 3-phase alternating current and three electrodes, the resultant voltage between two electrodes will be 190–380 volts, which voltages have not hitherto been used in electric electrode furnaces of a technical-commercial scale. The number of the electrodes will be relatively small, especially at the highest voltage, even if the resistance per electrode is maintained at, for instance, 0.03 to 0.04 ohm. In the latter case, i. e. when using voltages below 110 volts, the number of the electrodes must be increased in order to obtain a lower supply of power per electrode so that the voltage used will come in such relation to the power per electrode as corresponds to the desired high resistance. The former alternative involves the advantage of smaller losses of energy in the transformers, conductors etc. a higher power factor and a cheaper electric furnace equipment, whereas the latter alternative entails the advantage of a better distribution of the heat over the whole surface of the bath in the furnace.

Against the manner mentioned above of regulating the current supply according to a given ohmic resistance between an electrode and the metal bath or the slag bath respectively, the objection might be made, that the division of the resistance in slag and arc will be dependent on the cross section of the electrode, as the current supplied will be distributed over a greater surface of the slag bath and the resistance in the slag will be lower, the larger the cross section of the electrode is. It may be that this holds true when the electrode is immersed in or is in contact with the slag, but as soon as an arc is formed between the electrode and the slag, said arc will run between, or instance, a part of the lower edge of the electrode and the bath and usually move along the circumference of the electrode. For this reason, the distribution of the current in the slag, when working with an arc, will still remain practically independent on the diameter of the electrode, at least within the limits of the electrode diameter which need to be taken into consideration for furnaces of a technical-commercial scale. Another reason why no special regard needs to be paid to the electrode diameter, is that during working the cross section of the lower part of the electrode will always be reduced and will vary at different times. When using an electrode of large cross section the resistance per electrode may, however, be held somewhat lower than when using an electrode of small cross section, it being, however, understood that the resistance always must be maintained above the lower limit of 0.02 ohm.

Besides for producing iron and iron alloys mentioned above as examples, wherein a charge of iron oxide and, if required, oxide of an alloying metal together with reducing agent is treated which reducing agent may be a thermic reducing agent such as ferro-silicon, ferro-aluminium-silicon, aluminium or the like or it may consist of carbon of any kind or of a mixture of carbon and a thermic reducing agent, the process according to the invention may suitably be applied in the production of other metals from their oxide ores, for instance aluminium and aluminium alloys from clay or bauxite, or from their sulphide ores by using for instance calcium or iron as sulphur binding agent, for instance zinc from complex ores containing zinc and lead. Consequently, the invention is not limited to the materials mentioned above as examples but may be applied to all production of metals from ores or other metalliferous materials.

What I claim as new and desire to secure by Letters Patent of the United States of America is:—

1. A process for producing metal on a commercial scale, which consists in subjecting a metalliferous charge on top of a slag bath in an electric furnace to an arc from a downwardly extending electrode positioned above the charge, the charge and electrode being connected to a suitable source of electrical energy, developing sufficient energy in the afore described circuit to melt the charge, and spacing the electrode sufficiently far from the charge to make the ohmic resistance of the circuit a minimum of 0.02 ohm.

2. A process for producing metal on a commercial scale, which consists in subjecting a charge of ore resting on top of a slag bath in an electric furnace having an adjustable electrode to an arc from said electrode, the circuit of said arc comprising the electrode, a suitable source of electrical energy, the slag and the ore, developing sufficient energy in the afore described circuit to reduce and melt the ore, and regulating the space between the ore and the electrode so as to maintain the combined resistance of the arc and the slag at a minimum value of 0.02 ohm.

3. In a process for producing metal on a commercial scale wherein a charge of ore resting on the surface of a slag bath in an electric furnace is subjected to an electric arc from an electrode positioned above the charge of ore and whose circuit comprises an adjustable electrode, a suitable source of electrical energy, the slag and the ore, whereby the ore is smelted and reduced, the new slag formed as a result of the reduction of the ore passing to the main body of slag beneath the original charge of ore, and the resulting metal being deposited beneath the slag, the steps of developing sufficient energy in the afore described circuit to melt and reduce the ore, and regulating the space between the electrode and the charge of ore so as to maintain a combined arc and slag resistance at a minimum value of 0.02 ohm.

4. In a process for producing carbon binding materials of low carbon content on a commercial scale wherein a charge of oxide ore and reducing agent is introduced gradually into an electric furnace and reduced and melted on top of a slag bath in said furnace to form metal and slag under the heat of an electric arc whose circuit comprises an adjustable electrode positioned above the slag bath and charge of ore resting upon it, a suitable source of electrical energy, the slag bath and charge of ore resting upon it, a the steps of supplying sufficient energy in the afore described circuit to melt and reduce the charge of ore, and regulating the space between the charge of ore and the electrode so as to maintain the combined resistance of the arc and the slag at a minimum value of 0.02 ohm.

In testimony whereof I affix my signature.

EMIL GUSTAF TORVALD GUSTAFSSON.